United States Patent [19]

Pendergraft

[11] Patent Number: 4,842,843

[45] Date of Patent: Jun. 27, 1989

[54] REMOVAL OF WATER VAPOR DILUENT AFTER REGENERATION OF METAL OXIDE ABSORBENT TO REDUCE RECYCLE STREAM

[75] Inventor: Paul T. Pendergraft, Tulsa, Okla.

[73] Assignee: Amoco Corporation, Chicago, Ill.

[21] Appl. No.: 134,329

[22] Filed: Dec. 17, 1987

[51] Int. Cl.⁴ .................. C01B 17/04; B01D 53/04
[52] U.S. Cl. ..................... 423/574 R; 422/171; 422/172; 423/230
[58] Field of Search .............. 423/230, 574 R; 422/160, 171, 172, 190

[56] References Cited

U.S. PATENT DOCUMENTS

| | | | |
|---|---|---|---|
| 4,044,114 | 8/1977 | Dezael et al. | 423/574 R |
| 4,088,736 | 5/1978 | Courty et al. | 423/230 |
| 4,426,369 | 1/1984 | Palm | 423/574 R |
| 4,442,078 | 4/1984 | Jalan et al. | 423/230 |
| 4,526,590 | 7/1985 | Palm et al. | 423/574 R |
| 4,533,529 | 8/1985 | Lee | 423/230 |

FOREIGN PATENT DOCUMENTS 159730 10/1985 European Pat. Off. ........ 423/574 R

OTHER PUBLICATIONS

Beavon et al., "High Recovery, Low Emissions Promised for Claus-Plant Tail Gas", Oil and Gas Journal, 3-12-1979, pp. 76-80.

Goar et al., "Claus Plant Capacity Boasted by Oxygen-Enrichment Process", Oil and Gas Journal, 9-30-1985, pp. 39-41.

Primary Examiner—John Doll

[57] ABSTRACT

In a process in which ZnO is used to absorb $H_2S$ and/or $SO_2$ from Claus Plant tail gas, producing ZnS, and in which ZnS is regenerated using $O_2$ producing regeneration effluent, the volume of regeneration effluent containing sulfur species which must be further processed is reduced or diminished in quantity by diluting the oxygen containing gas with water prior to regeneration of ZnS to ZnO and thereafter removing at least a portion of the added water.

14 Claims, 4 Drawing Sheets

REMOVAL OF WATER VAPOR DILUENT AFTER REGENERATION OF METAL OXIDE ABSORBENT TO REDUCE RECYCLE STREAM

FIELD OF THE INVENTION

The invention relates to the removal of sulfur and sulfur compounds from gaseous streams containing such compounds. In one aspect, the invention relates to the removal of sulfur compounds, including $H_2S$ (hydrogen sulfide) and $SO_2$ (sulfur dioxide) from Claus plant tailgas. In a particular aspect, the invention relates to method and apparatus for regenerating sulfided absorbent (zinc sulfide, ZnS) to the oxide (zinc oxide, ZnO) which results in a smaller volume of regeneration effluent being provided to subsequent processing.

SETTING OF THE INVENTION

A developing area of sulfur recovery technology is that of tailgas cleanup, that is, of removing trace quantities of sulfur compounds from gaseous effluent streams (tailgas) of Claus process sulfur recovery plants. Tailgas may contain substantial amounts of sulfur compounds. Tailgas from Claus or extended Claus plants (having at least one Claus low temperature adsorption reactor) typically can contain about 0.5–10% of the sulfur present in feed to the plant as elemental sulfur, $H_2S$, $SO_2$, COS (carbonyl sulfide), $CS_2$ (carbon disulfide), and the like. Tailgas cleanup processes remove at least part of such residual sulfur compounds from Claus tailgas.

While such processes can be quite effective in removing residual compounds from the Claus plant tailgas, the compounds thus removed must be disposed of. This can be accomplished by regenerating the medium used for removal of the sulfur compound and then, for example, in using ZnO absorbents, returning the regenerator effluent comprising such sulfur compounds as $SO_2$ to the Claus unit where elemental sulfur is formed by reaction with $H_2S$.

Temperature limitations during regeneration mean that a large volume of diluent gas must be used during regeneration to sufficiently dilute oxygen to avoid damage to the absorbent due to heat rise during regeneration if oxygen is present in excessive amounts. The result is a correspondingly large volume of regeneration effluent. If the resulting large volume of regeneration effluent gas is returned to the Claus unit, the Claus unit must be sized for handling that volume of gas. Therefore, a major factor in reducing the cost of the Claus plant is reducing the volume of regeneration effluent returned to the Claus plant.

Thus, a major consideration in a process such as described in U.S. Pat. No. 4,533,529 is the relatively large volume of regeneration effluent gas which must be recycled to the Claus plant as a result of regeneration of ZnS to ZnO. During regeneration, the sulfided absorbent ZnS is contacted with oxygen at temperatures above 1000° F., preferably above 1100° F., and the ZnS is converted to ZnO. This is a highly exothermic reaction and to avoid overheating and damaging the absorbent, the oxygen content in the regeneration gas is preferably not greater than about 2.5–3.5 mol %. Therefore, the air used for regeneration must be diluted with an inert diluent. The diluent may be provided in part by burning fuel gas in the regeneration heater to heat the air to the required temperature for regeneration. However, additional diluent is required to achieve the preferred oxygen concentration. One source of diluent is the effluent from an absorber on absorption as this is a convenient source of hot relatively inert gas.

In a process such as described in U.S. Pat. 4,533,529, the regeneration effluent stream exiting the ZnS regenerator contains primarily nitrogen, carbon dioxide, and water vapor with a small amount of sulfur dioxide. This stream is cooled, compressed and recycled to the Claus furnace and can represent a significant fraction of the gas which must be processed in the Claus plant as well as in the downstream equipment comprising the absorbers and regenerators.

The following Table 1 lists the composition of a typical regeneration effluent stream and the fraction of the acid gas and waste heat boiler effluent that this stream represents for two plant configurations. Table 1 indicates the incremental increase in the size of the Claus plant due to recycle of regeneration effluent. The incremental increase is based on the volume of effluent from the first pass of the waste heat boiler downstream of the Claus furnace since this is a stream that contains the total volume flow of gases through the plant prior to any stream splitting or sulfur condensation. Thus, this stream provides a measure of the effect of the invention in its various aspects on total volume flow through a plant. Table 1 also indicates the increase in cost of the Claus plant due to the recycle stream from the ZnS regenerator. These costs are incremental costs for increasing the capacity of a new construction (grass roots) plant. Increasing the capacity of an existing plant in order to retrofit ZnO absorbers and ZnS regenerators can be much more expensive than the costs set forth in the Table.

TABLE 1

Recycle Stream Composition and Rate for Various Plant Configurations

| | Plant 1 | Plant 2 |
|---|---|---|
| Regeneration Diluent Source | Abs Effl | Abs Effl |
| Recycle Gas Composition, mol %: | | |
| $H_2$ | 0.022 | 0.039 |
| $H_2O$ | 30.013 | 30.863 |
| CO | 0.036 | 0.041 |
| $N_2$ | 63.215 | 62.583 |
| $O_2$ | 0.000 | 0.000 |
| $CO_2$ | 5.442 | 5.491 |
| $H_2S$ | 0.000 | 0.000 |
| $SO_2$ | 1.272 | 0.983 |
| Total | 100.000 | 100.000 |
| Recycle Gas Rate | | |
| Percent of Acid Gas Rate | 103.2 | 58.4 |
| Percent of WHBl Effl Rate | 26.0 | 16.56 |
| Incremental Increase in Size of the Claus Plant due to Recycle Stream as a Percent of the Claus Size Without the Recycle, Based on WHBl Effluent. | 32.89 | 18.78 |
| Incremental Increase in Cost of the Claus Plant due to Recycle Stream as a Percent of the Claus Cost Without the Recycle | 18.60 | 10.88 |

Table 1 is based on typical plant designs for an acid gas containing about 80 mol percent $H_2S$. Plant 1 is a three Claus catalytic reactor Claus plant having ZnO absorbers where the second and third Claus catalytic reactors are alternately operated under conditions for forming and depositing sulfur on catalyst therein. Plant 2 is a four catalytic reactor Claus plant where at least two of the catalytic reactors are alternately operated under conditions for forming and depositing sulfur on catalysts therein. Table 1 shows that recycling regeneration effluent to the Claus plant significantly increases the size and cost of both plants, although the increase is less for Plant 2 than for Plant 1.

SUMMARY OF THE INVENTION

The invention provides method and apparatus for reducing the volume of regeneration effluent returned to a Claus plant when metal oxide absorbers and regenerators are used for tailgas cleanup, and provides resulting benefits of reduced size and cost of such plants.

The invention envisions using as a diluent for producing regenerator feed for regenerating ZnS to ZnO a gas which can be readily separated from the regenerator effluent before regenerator effluent is returned to the Claus plant for further processing. In this way, the volume of regeneration effluent returned to the Claus plant is reduced and so is the size and cost of the plant required.

According the invention, there is provided a process and apparatus for diminishing the quantity of sulfur species in the tailgas from a Claus plant and for producing plant effluent having such a diminished quantity of sulfur species. $H_2S$ and $SO_2$ are removed from the tailgas gas of a Claus plant by reaction with zinc oxide (ZnO) in an absorber zone, optionally after converting sulfur species to $H_2S$, producing zinc sulfide (ZnS) and plant effluent. The ZnS is regenerated to ZnO and a dried stream comprising one of $H_2S$ and $SO_2$ is produced by steps comprising diluting an $O_2$-containing gas with water vapor and using the dilute $O_2$-containing stream for regenerating ZnS to ZnO producing a regeneration effluent stream comprising $SO_2$. Then water is removed from the resulting regeneration effluent stream and the dried regeneration stream comprising one of $H_2S$ and $SO_2$ is produced. The dried regeneration stream comprising one of $H_2S$ and $SO_2$ is then returned to the Claus plant from which the tailgas is derived for further processing.

According to a further aspect of the invention, the regeneration effluent stream comprising $SO_2$ is subjected to conditions for converting substantially all of the sulfur species to $H_2S$ prior to the water removal step.

In accordance with another aspect of the invention, oxygen enriched gas is used for oxidant feed to the Claus plant for the purpose of reducing the volume flow of gas through the Claus plant in accordance with the invention.

DETAILED DESCRIPTION OF THE INVENTION

According to the invention, sulfur is formed and recovered from an acid gas feed to a Claus plant including removing both $H_2S$ and $SO_2$ from the Claus plant tailgas by reaction in an absorber zone containing ZnO, optionally after first converting substantially all sulfur species to $H_2S$, producing ZnS and absorber effluent. ZnS is regenerated to ZnO and the regeneration effluent stream is returned to the Claus plant for processing.

The regeneration of ZnS to ZnO is highly exothermic and the use of air or other gases rich in $O_2$ to accomplish regeneration can damage the absorbent due to the high temperatures which would be reached in the regenerator. Therefore, the oxygen-containing regeneration gas must be diluted to control the temperature rise.

In accordance with the invention, the $O_2$-containing gas used for regeneration is diluted with water ($H_2O$) vapor prior to using such gas for regenerating ZnS to ZnO producing a regeneration effluent stream comprising $SO_2$ and $H_2O$, and removing at least a portion of $H_2O$ therefrom producing a dried $SO_2$ containing stream, and returning the dried $SO_2$ containing stream to the Claus plant. Alternatively, the regeneration effluent stream comprising $SO_2$ can be subjected to conditions for converting sulfur species to $H_2S$ prior to the water removal step and then a dried $H_2S$-containing stream is returned to the Claus plant.

Figure 1:
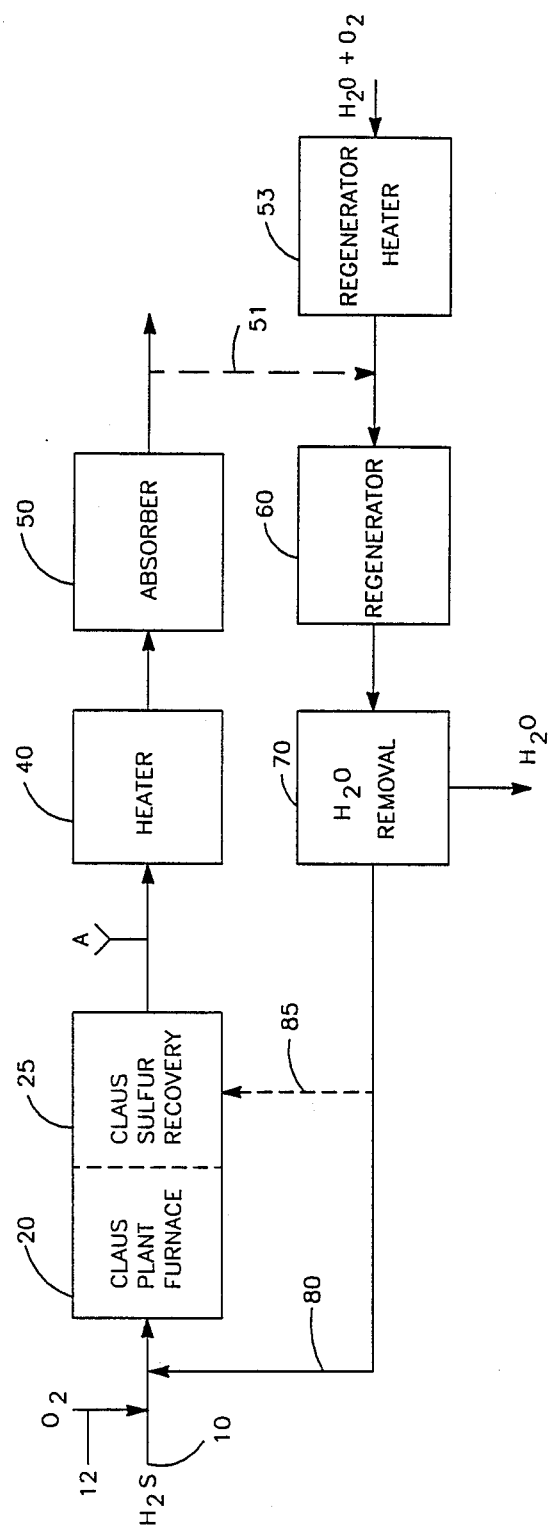
FIG. 1 illustrates schematically the invention in a Claus plant having one or more high temperature Claus reactors.
Figure 2:
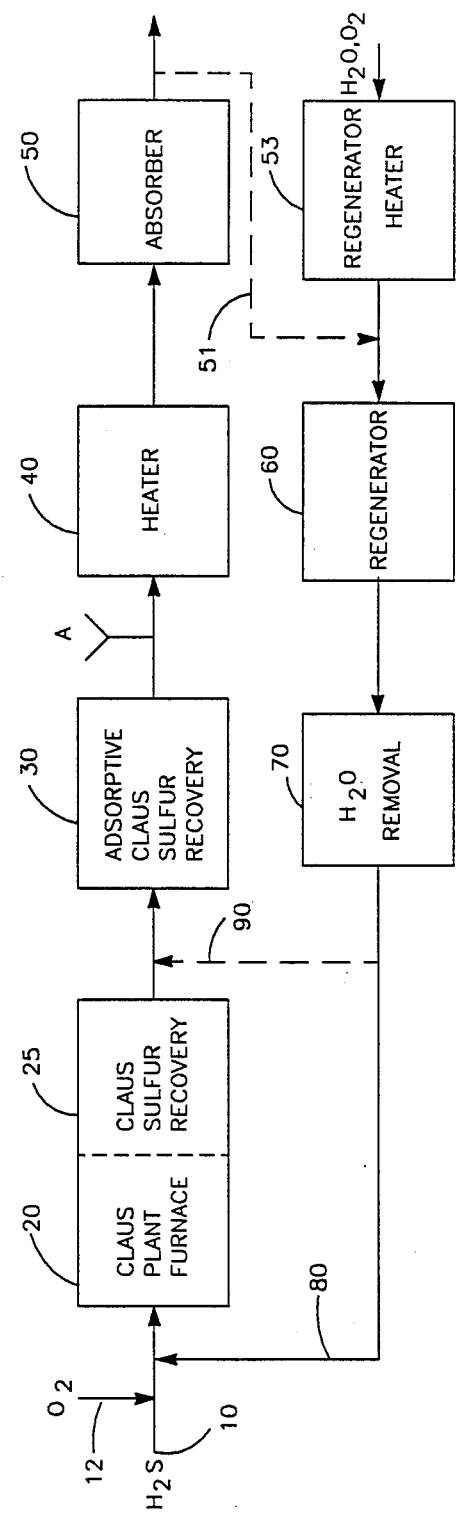
FIG. 2 schematically illustrates the invention in a Claus plant having one or more low temperature (adsorptive) Claus catalytic reactors.
Figure 3:
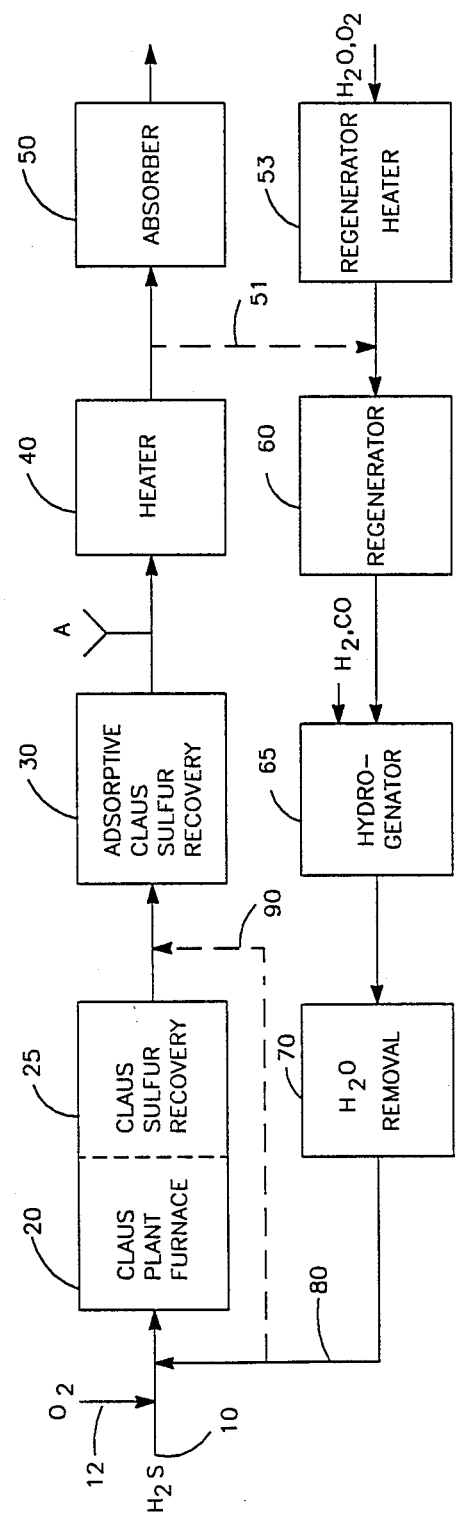
FIG. 3 schematically illustrates an embodiment of the invention where $SO_2$ in the regenerator effluent is converted to $H_2S$ prior to water removal.

Referring to FIGS. 1, 2, and 3, $H_2S$ containing stream 10 and an oxidant-containing stream 12 such as air or oxygen-enriched air are fed to a Claus plant comprising Claus furnace 20 and Claus catalytic recovery zone 25 operated above the sulfur dewpoint. The Claus furnace can be a muffle furnace, a fire-tunnel furnace, or the like, in which about ⅓ of the $H_2S$ is converted to $SO_2$ at temperatures of 1800°–2600° F.

According to an aspect of the invention, oxidant stream 12 can contain air or oxygen enriched air or substantially pure oxygen. When oxygen enriched air or pure oxygen are used, the regeneration recycle stream in line 80 is returned to the Claus furnace 25 in an amount sufficient to prevent the temperature rise due to the use of oxygen enriched air from exceeding equipment temperature limitations. In addition, or in the alternative, regeneration effluent can be returned to a Claus catalytic reactor operated above the sulfur dewpoint by line 85, as shown in FIG. 1, or to a Claus catalytic adsorption reactor by line 90, as shown in FIG. 3. Care should be taken during operation to insure that molecular oxygen is not introduced into Claus catalytic reactors 25 or 30.

The regeneration effluent stream can be introduced into the Claus furnace with the oxygen-containing stream at a rate effective for diluting the oxygen concentration in the Claus furnace to a level where the heat of combustion in the thermal reaction zone is such as to maintain the temperature therein below about 2600° F., preferably in the range of about 2000° F. to about 2400° F. The rate of introduction can be readily determined by a person skilled in the sulfur recovery arts for particular feed stream compositions, rates, and the like.

By enriching the oxygen content of the oxidant feed to the furnace, the volume flow of gas through the plant can be further diminished. This provides a particularly advantageous result where Claus adsorptive catalytic reactors form part of or are added to the Claus plant. The result is that Claus adsorptive catalytic reactors, zinc oxide absorbers, and regeneration recycle equipment can be added to the Claus plant without significant modification to the Claus plant. Where, as discussed below, the step of removing water from the regeneration effluent stream comprises removing water and producing a dried regeneration effluent stream comprising SO$_2$, the oxygen enrichment can be in the range of 0.05 to about 10 mol percent to yield an oxidant stream having oxygen in the range of about 21 to about 31 mol percent. Where, as discussed below, the step of removing water from the regeneration effluent stream comprises hydrogenation of the regeneration effluent stream comprising SO$_2$ under conditions for converting SO$_2$ to H$_2$S and removing water from the resulting H$_2$S containing stream and producing a dried regeneration effluent stream comprising H$_2$S, the oxygen content of the oxidant stream can be increased by about 3 to about 15 mol percent to yield an oxidant stream containing from about 24 to about 36 mol percent oxygen. Increasing the oxygen content to values in these ranges can provide the result that no significant increase in volume flow, or in cost, of the Claus plant will be required to increase the recovery of sulfur as described herein. Further oxygen enrichment can further diminish the volume flow of gases through the Claus plant and may be desirable. Thus, the oxygen content can be increased to be in the range from about 21 to about 100 mol percent of the oxidant stream to the Claus plant.

Claus furnace effluent is cooled, optionally passed through a sulfur condenser to remove elemental sulfur, and fed to a Claus catalytic reaction zone 25 operated above the sulfur dewpoint (inlet temperature about 350°–650° F.). Sulfur formed by the Claus reaction $$2H_2S + SO_2 \rightarrow 3S + 2H_2O \tag{1}$$

in the presence of a Claus catalyst such as bauxite or alumina or titania is continuously removed as sulfur vapor and condensed and recovered by a sulfur condenser. One or more above-the-dewpoint Claus catalytic reactors and associated sulfur condensers (schematically illustrated in the figures by zone 25) can be used as is known.

The effluent from zone 25 can be provided to Claus catalytic adsorption zone 30 (see FIGS. 2 and 3) where elemental sulfur formed by the Claus reaction in the presence of a catalyst is predominantly deposited on the Claus catalyst therein at a temperature generally in the range of 160°–330° F. and is periodically removed by heating. Such a process is sometimes referred to as Cold Bed Adsorption (CBA).

The operation of Claus plants such as shown in FIGS. 1, 2, and 3 having Claus furnaces, Claus high temperature reactors, and, optionally, Claus low temperature adsorptive catalytic reactors is well known in the art and need not be further described here.

The effluent from zone 25 of FIG. 1 or from zone 30 of FIGS. 2 and 3 comprising H$_2$S, SO$_2$, organic sulfides, and reducing species H$_2$ and CO, is provided to heater 40 where it is heated to above about 1000° F. (for example, 1000° to 1200° F.) so that both H$_2$S and SO$_2$ can be removed in absorber zone 50 in the presence of reducing species and a zinc oxide adsorbent. Alternatively, sulfur species other than H$_2$S can be converted to H$_2$S in a hydrogenation zone (not shown) such as is known to those skilled in the art prior to introduction into absorber 50. Absorber 50 can then be operated at a lower temperature, for example, above 600° F. (600°–1000° F.)

The reducing species, for example, H$_2$ and/or CO required for conversion of sulfur compounds in the tailgas to H$_2$S can be obtained from any convenient source including that present in the tailgas as H$_2$, or available from a donor such as CO, which can react with water to yield H$_2$.

Claus plant 20, Claus catalytic reactor 25, and Claus adsorber 30 are preferably operated so that a 2:1 ratio of H$_2$S:SO$_2$ is maintained at point A. This maximizes sulfur recovery in the Claus plant and minimizes the amount of sulfur remaining in the Claus plant tailgas to be removed by the ZnO absorber 50. Such ratio can be maintained by control systems well known in the art and need not be further described here.

As used herein, the terms absorbent, ZnO, ZnO absorbent, and the like, shall mean an absorbent effective for removal of H$_2$S, and preferably both H$_2$S and SO$_2$, in the presence of reducing species. A major portion of the active absorbent, for example, 50% or more, is in the form of ZnO. The absorbent can also contain binders, strengtheners, and support materials, for example, alumina, calcium oxide, and the like. Zinc sulfide and zinc sulfate can be used as starting materials and treated with heat and/or oxygen to produce an active absorbent. Other suitable starting materials can also be used. The ZnO absorbent is effective for absorbing H$_2$S by undergoing sulfidization to produce a laden (sulfided) absorbent; simultaneously, if desired, hydrogenation of other sulfur compounds to H$_2$S followed by such absorption can occur. Preferably the ZnO absorbent is capable of a high level of removal of sulfur compounds and is relatively insensitive to water.

Particularly preferred are ZnO absorbents which are thermally stable, regenerable, and capable of absorbing substantial amounts of sulfur compounds. An acceptable absorbent is United Catalysts, Inc., G72D Sulfur Removal Catalyst, available from United Catalysts, Inc., Louisville, Ky.

Representative chemical reactions occurring during absorption are shown below:

$$H_2S + ZnO \rightarrow ZnS + H_2O \tag{2}$$

$$COS + ZnO \rightarrow ZnS + CO_2 \tag{3}$$

$$CS_2 + 2\ ZnO \rightarrow 2\ ZnS + CO_2 \tag{4}$$

$$SO_2 + 3\ H_2 \rightarrow H_2S + 2\ H_2O \tag{5}$$

$$H_2S + \text{Sulfated Absorbent} \rightarrow SO_2 + ZnO\ \text{Absorbent} \tag{6}$$

While absorption is occurring in zone 50, zinc sulfide can be regenerated in regenerator 60 by introducing an oxygen containing gas, diluted with H$_2$O in accordance with the invention. During regeneration:

$$ZnS + 3/2\ O_2 \rightarrow ZnO + SO_2 \tag{7}$$

$$\text{Absorbent} + SO_2 + O_2 \rightarrow \text{Sulfated Absorbent} \tag{8}$$

Temperature rise during regeneration can suffice if unchecked to destroy both the physical integrity and the chemical activity of the absorbent as well as to exceed metallurgical limits of preferred materials of construction. Consequently, temperature rise during regeneration is preferably controlled such that the effluent is less than about 1500° F.

During regeneration, a temperature rise of about 145° F. occurs for each mol % of oxygen consumed in converting ZnS back to ZnO. Preferably, from about 0.4 mol % or less to about 3.5 mol % oxygen can be used during regeneration when the regeneration stream is introduced at about 1000° F., and to about 2.75 mol %

$O_2$ when the regeneration stream is introduced at about 1100° F.

Regenerator feed comprising a diluent gas and $O_2$, for example, from air, can be heated in regenerator heater 53 and provided to regenerator 60. In accordance with the invention, the diluent is water vapor. Such a diluent is inexpensive, readily available, does not significantly react with or on the absorbent at regeneration temperatures, and is readily removed from the regeneration effluent stream.

Thus, $H_2O$ and an $O_2$-containing gas are introduced into regeneration heater 53 and heated to effective regeneration temperature. Regeneration heater 53 can be an indirect heater such as an indirect fired heater or an electric heater, or can be a direct heater such as an inline burner. Indirect eaters are preferred for minimizing amounts of noneasily-removable diluents in the regeneration gas.

$H_2O$ vapor is preferably introduced in sufficient quantity to reduce the $O_2$ concentration to a suitable level, preferably in the range of 0.4 to 3.5 mol %. Where air is used as the source of $O_2$, the regenerator feed will contain about 80.0 to about 98.0 mol % water. Where pure $O_2$ is used, $H_2O$ vapor will be in the range of about 96.5 mol % to about 99.6 mol %.

Other sources of inert diluent gas can also be introduced with the water, for example, nitrogen. $H_2O$ content will correspondingly decrease and so will the benefit in reducing volume of regeneration effluent recycle by removal of the water following regeneration.

Following regeneration, sulfated absorbent can be reduced using a suitable reducing gas, for example, a portion of absorber effluent by line 51 from absorber 50 to which no oxygen has been admixed. During purging:

Sulfated Absorbent + $H_2$ → Absorbent + $SO_2$ + $H_2O$  (9)

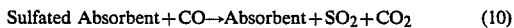

Sulfated Absorbent + CO → Absorbent + $SO_2$ + $CO_2$  (10)

Reduction of the sulfated absorbent will occur at temperatures above about 1000° F., but preferably not much greater than about 1200° F., in the presence of $H_2$, CO, or other reducing species such as $H_2S$.

The regeneration effluent stream is preferably dried by contacting with cooled water substantially saturated with $SO_2$. The preponderance of the water can thus be condensed and removed without significant absorption of $SO_2$. This operation requires a minimum amount of water circulation because the gas needs to be cooled only enough to condense part of its water content. Energy consumption can be reduced because most of the water stream used in a quench tower to cool the single species gas is merely cooled and returned to the quench tower, and need not be stripped to remove the $SO_2$.

In the invention as illustrated in FIGS. 1 and 2, the regeneration effluent stream from zone 60 can be provided to a water removal zone 70 in which a substantial portion of the water present is removed to provide a dried stream of reduced water content.

In the invention illustrated in FIG. 3, the regeneration effluent from zone 60 can be provided to hydrogenation zone 65 where the stream is cooled and $SO_2$ therein is converted to $H_2S$ over an effective catalyst in the presence of reducing species. Such hydrogenation zones are known to those skilled in the art and need not be described in detail. See also Example II.

Then, following conversion of $SO_2$ to $H_2S$, the stream is cooled and water is removed in water removal zone 70.

Water removal zone 70 can comprise any effective means for condensing water from the regeneration stream, for example, heat exchangers, coolers, contact condensers and the like.

Thus, water removal zone 70 can comprise a contact condenser, for example, a quench tower. In the contact condenser, regeneration effluent is contacted with water having a temperature from about 40° F. (4° C.) to about 120° F. (50° C.) to condense and remove water.

Figure 4:
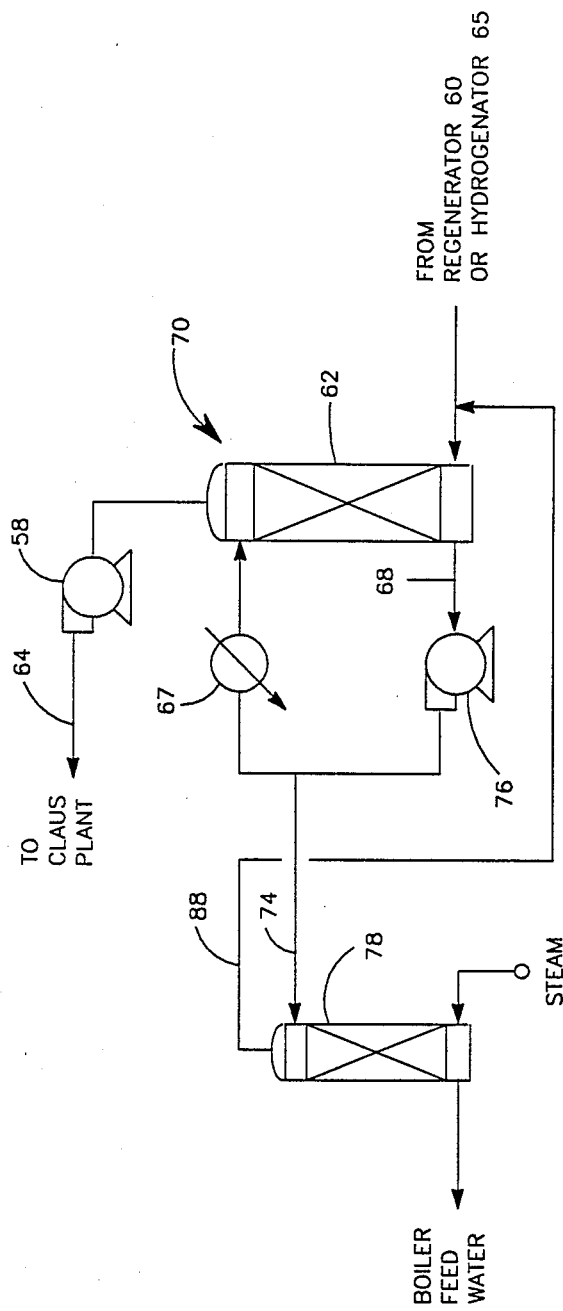
FIG. 4 illustrates preferred apparatus for removing water from regenerator effluent.

Thus, referring particularly to FIG. 4, FIG. 4 illustrates a water removal zone indicated generally by reference numeral 70. As shown, effluent from regenerator 60 in FIGS. 1 and 2 or from hydrogenator 65 in FIG. 3 can be cooled (not shown), provided to quench tower 62, and then repressurized by compressor 58. In tower 62, the regeneration effluent is contacted with a cooled water stream provided from cooler 67 and water is removed, producing a relatively dry, cool stream in line 64 which is returned to the Claus plant. Stream 64 will contain $SO_2$ (or $H_2S$ in the configuration of FIG. 3) and inert components which may be present such as $CO_2$, $N_2$, and $H_2O$ depending on the source of diluent gas provided to heater 53, and on the type of heater 53 employed, and can be provided by lines 80, 85, and 90, respectively, to Claus furnace 20, Claus catalytic reactor 25, and/or Claus adsorptive catalytic reactor 30. Water can be recycled from the base to the top of tower 62 by line 68 and pump 76 and cooler 67. A small stream 74 can be removed to stripper column 78 and $H_2S$ or $SO_2$ therein stripped out and returned by line 88 to tower 62, thence to the Claus plant.

ILLUSTRATIVE EXAMPLE I

FIGS. 1 and 2 show embodiments of the invention which illustrate schematically the use of the invention with plants described for Table 1 above. Steam or water vapor is mixed with air and heated for use as the regeneration gas in regeneration heater 53. Regeneration heater 53 is an indirect heater so the regenerator gas will contain no other diluents and will consist only of nitrogen, water, and oxygen. This produces a minimum recycle stream where air is used, but see Example 3 below. If the heater 53 were a direct fired heater, then the regeneration gas would also contain carbon dioxide and possibly carbon monoxide and hydrogen as the products of combustion. This would have the effect of increasing the volume of the regeneration effluent recycled to the Claus plant.

For this and other examples, the feed to the regenerator will be considered to contain about 2.5 mol % oxygen. This regeneration gas contains no hydrogen or carbon monoxide that could also oxidize in the reactor and release heat, so the oxygen concentration might be increased somewhat as compared with the use of absorber effluent as diluent (see U.S. Pat. No. 4,533,529) without overheating the absorbent. All of the oxygen is assumed to be used for regenerating ZnS.

Where the heater is an indirect heater, an illustrative stream composition would be:

|  | lbmol per 100 lbmol of Regeneration Feed | mol % |
|---|---|---|
| $O_2$ | 2.5 | 2.5% |
| $N_2$ | 9.4 | 9.4% |

-continued

|  | lbmol per 100 lbmol of Regeneration Feed | mol % |
|---|---|---|
| $H_2O$ | 88.1 | 88.1% |

The effluent from the regenerator would have the following composition:

|  | lbmol per 100 lbmol of Regeneration Feed | mol % |
|---|---|---|
| $SO_2$ | 0.83 | 0.84% |
| $N_2$ | 9.4 | 9.56% |
| $H_2O$ | 88.1 | 89.60% |

The regeneration effluent is next cooled to reduce the water content. This can be done in a waste heat boiler, a gas/gas exchanger, an air cooler, a quench tower, or some combination of this equipment. This produces a recycle stream which can be compressed and recycled to the Claus furnace or to a Claus catalytic reactor. If the recycle stream is cooled to 110° F. and is water saturated at one atmosphere pressure, it will have the following composition:

|  | lbmol per 100 lbmol of Regeneration Feed | mol % |
|---|---|---|
| $SO_2$ | 0.83 | 7.41% |
| $N_2$ | 9.4 | 83.93% |
| $H_2O$ | 0.97 | 8.66% |

The following Table 2 lists the composition of the recycle stream and estimates the fraction of the acid gas and waste heat boiler first pass effluent that this stream represents for the plant configurations described for Table 1 above. It also estimates the increase in the cost of the Claus plant (furnace through the adsorptive Claus reactor) due to the regeneration effluent stream being recycled to the Claus plant. The calculations assume that a negligible amount of $SO_2$ is absorbed into the condensing water during the cooling of the regeneration effluent. The calculations also assume that the purge and regeneration rates have been adjusted so that the recycle stream is nearly equal during the two periods of purging and regeneration.

TABLE 2

Recycle Stream Composition and Rate for Modified ELSE Configurations
Steam Dilution of Regeneration Gas and $SO_2$ Rich Recycle

|  | Plant 1 | Plant 2 |
|---|---|---|
| Regeneration Diluent Source | Steam | Steam |
| Recycle Gas Composition, mol %: |  |  |
| $H_2$ | 0.00 | 0.00 |
| $H_2O$ | 8.66 | 8.66 |
| CO | 0.00 | 0.00 |
| $N_2$ | 83.93 | 83.93 |
| $O_2$ | 0.00 | 0.00 |
| $CO_2$ | 0.00 | 0.00 |
| $H_2S$ | 0.00 | 0.00 |
| $SO_2$ | 7.41 | 7.41 |
| Total | 100.00 | 100.00 |
| Recycle Gas Rate |  |  |
| Percent of Acid Gas Rate | 17.34 | 7.72 |
| Percent of WHB1 Effl Rate | 5.60 | 2.55 |
| Incremental Increase in Size of the Claus Plant due to Recycle Stream as a Percent of the Claus Size Without the Recycle, | 3.83 | 1.69 |

TABLE 2-continued

Recycle Stream Composition and Rate for Modified ELSE Configurations
Steam Dilution of Regeneration Gas and $SO_2$ Rich Recycle

|  | Plant 1 | Plant 2 |
|---|---|---|
| Based on WHB1 Effluent. Incremental Increase in Cost of the Claus Plant due to Recycle Stream as a Percent of the Claus Cost Without the Recycle | 2.28 | 1.01 |

A comparison of Table 2 with Table 1 clearly shows the advantage of using steam as regeneration diluent and then condensing the steam from the regenerator effluent. The regeneration effluent stream recycled to the Claus plant is much smaller. For new construction, the incremental increase in the Claus plant are significantly smaller. For a retrofit application, the smaller recycle makes it easier to add ZnO absorbers to an existing plant operating near its design rate without making major revisions.

ILLUSTRATIVE EXAMPLE II

One aspect of the process as shown in FIGS. 1 and 2 is that the regenerator effluent from which the water is condensing contains $SO_2$. The condensed water will therefore contain some $SO_2$ and any $SO_3$ which may have formed during regeneration and will therefore be acidic and corrosive. The coolers, quench tower, or whatever method of cooling the gas that is chosen will need to be constructed from special materials resistant to acidic corrosion and the water will have to be treated before disposal.

An alternative embodiment of the invention that precludes the problem of condensing acidic water is shown in FIG. 3. As illustrated therein, the regenerator effluent is cooled to about 600° F. and mixed with a reducing gas stream (containing CO and/or $H_2$) and fed to a hydrogenator. The reducing gas may be formed in a reducing gas generator/burner burning fuel gas ($CH_4$) with substoichiometric air. The reducing gas generator can be fed fuel at about 75% of stoichiometric air, which causes approximately the following oxidation of methane to occur:

$$2\ CH_4 + 3\ O_2 \rightarrow 1\ CO + 1\ CO_2 + 1\ H_2 + 3\ HO$$

Allowing for 10% excess usable reducing compounds (about 15% of CO formed is not usable assuming that the water gas shift reaction is 85% complete), sufficient fuel gas would be burned and the products mixed with the regenerator effluent to give the following feed to the hydrogenator:

|  | lbmol per 100 lbmol of Regeneration Feed | | | Hydrog Feed |
|---|---|---|---|---|
|  | Regen Effl | Reducing Gas | Hydrog Feed | mol % |
| $SO_2$ | 0.83 | 0.00 | 0.83 | 0.670% |
| $N_2$ | 9.40 | 16.70 | 26.10 | 21.064% |
| $H_2O$ | 88.10 | 4.44 | 92.54 | 74.683% |
| CO | 0.00 | 1.48 | 1.48 | 1.194% |
| $CO_2$ | 0.00 | 1.48 | 1.48 | 1.194% |
| $H_2$ | 0.00 | 1.48 | 1.48 | 1.194% |

In the hydrogenator, the hydrogenation of sulfur compounds is assumed to be 100% complete, and the water-gas shift reaction (the reaction of CO and $H_2O$ to form $CO_2$ and $H_2$) is assumed to be 85% complete. The effluent from the hydrogenator is therefore:

|  | lbmol per 100 lbmol of Regeneration Feed | mol % |
|---|---|---|
| $SO_2$ | 0.00 | 0.00% |
| $H_2S$ | 0.83 | 0.667% |
| $N_2$ | 26.10 | 20.977% |
| $H_2O$ | 94.24 | 75.743% |
| CO | 0.22 | 0.177% |
| $CO_2$ | 2.74 | 2.202% |
| $H_2$ | 0.29 | 0.233% |

The hydrogenator effluent is next cooled to reduce the water content. This produces the recycle stream which is compressed and recycled to the Claus furnace. As before, this can be done in a waste heat boiler, a gas/gas exchanger, an air cooler, a quench tower, or some combination of this equipment. If the recycle stream is cooled to 110° F. and is water saturated at one atmosphere pressure, it will have the following composition:

|  | lbmol per 100 lbmol of Regeneration Feed | mol % |
|---|---|---|
| $SO_2$ | 0.00 | 0.00% |
| $H_2S$ | 0.83 | 2.512% |
| $N_2$ | 26.10 | 78.995% |
| $H_2O$ | 2.86 | 8.656% |
| CO | 0.22 | 0.666% |
| $CO_2$ | 2.74 | 8.293% |
| $H_2$ | 0.29 | 0.878% |

The following Table lists the composition of the recycle stream and estimates the fraction of the acid gas and waste heat boiler first pass effluent that this stream represents for the various plant configurations of Table 1. It also estimates the increase in the cost of the Claus plant due to the regenerator recycle stream.

TABLE 3

Recycle Stream Composition and Rate for Modified ELSE Configurations
Steam Dilution of Regeneration Gas and $H_2S$ Rich Recycle

|  | Plant 1 | Plant 2 |
|---|---|---|
| Regeneration Diluent Source | Steam | Steam |
| Recycle Gas Composition, mol %: |  |  |
| $H_2$ | 0.88 | 0.88 |
| $H_2O$ | 8.66 | 8.66 |
| CO | 0.67 | 0.67 |
| $N_2$ | 78.99 | 78.99 |
| $O_2$ | 0.00 | 0.00 |
| $CO_2$ | 8.29 | 8.29 |
| $H_2S$ | 2.51 | 2.51 |
| $SO_2$ | 0.00 | 0.00 |
| Total | 100.00 | 100.00 |
| Recycle Gas Rate |  |  |
| Percent of Acid Gas Rate | 43.51 | 21.08 |
| Percent of WHB1 Effl Rate | 12.64 | 6.58 |
| Incremental Increase in Size of the Claus Plant due to Recycle Stream as a Percent of the Claus Size Without the Recycle, Based on WHB1 Effluent. | 15.45 | 7.50 |
| Incremental Increase in Cost of the Claus Plant due to Recycle Stream as a Percent of the Claus Cost Without the Recycle | 9.00 | 4.44 |

Table 3 shows the reduction in the recycle stream is smaller for this embodiment than for the embodiment of FIG. 2, but still an improvement.

One advantage of this new process as shown in FIG. 3 over that in FIG. 2 is that the water produced from the hydrogenator effluent should be relatively pure ($H_2S$ is not very soluble in water) and after sending it to sour water stripping can be used as boiler feed water.

ILLUSTRATIVE EXAMPLE III

Another aspect of the invention exists in that oxygen enriched air may be used in the Claus furnace to further reduce the increase in volume flow through the plant due to the recycle of the regeneration effluent stream. Oxygen enrichment can be used for such purpose either for the configuration which does not use a hydrogenator on the recycle stream as illustrated in FIG. 2 and EXAMPLE I or for the configuration which includes a hydrogenator on the recycle stream as illustrated in FIG. 3 and EXAMPLE II. The amount of oxygen enrichment added to the furnace air stream can be adjusted to control the volume flow rate of process gas through the plant, preferably even to the point that the recycle stream does not cause a net increase in the plant flow rate. The use of oxygen enriched air in a Claus plant, as is understood by those familiar with the art, many times requires the addition of a diluent gas to be added to the furnace to prevent high furnace flame temperatures from damaging the refractory in it. According to the invention, the regeneration recycle stream provides this diluent.

Table 4 below illustrates the application of this aspect of the invention to prevent the increase in process gas flow rate through the Claus plant. In this EXAMPLE, Plant A is, like Plant 1 of EXAMPLE I, a three catalytic reactor Claus plant having ZnO absorbers (1) where the second and third Claus catalytic reactors therein are alternately operated under conditions for forming and depositing sulfur on catalyst and (2) where steam is used as diluent for the regeneration of the ZnO absorbers and a stream rich in $SO_2$ is recycled to the Claus furnace, except that, oxygen enriched air is used in the Claus furnace so that there is no net increase in the flow rate through the plant (as indicated by the flow from the first pass of the waste heat boiler). Plant B is, like Plant 1 of EXAMPLE II, a three catalytic reactor Claus plant having ZnO absorbers (1) where the second and third Claus catalytic reactors are alternately operated under conditions for forming and depositing sulfur on catalyst therein, (2) where steam is used as diluent for the regeneration of the ZnO absorbers and (3) where the regeneration effluent is hydrogenated so that a stream containing $H_2S$ is recycled to the Claus furnace, except that, oxygen enriched air is used in the Claus furnace so that there is no net increase in the flow rate through the plant (as indicated by the flow from the first pass of the waste heat boiler). This EXAMPLE illustrates the invention using a three catalytic reactor Claus plant where the second and third Claus catalytic reactors are alternately operated under conditions for forming and depositing sulfur on catalysts therein. This aspect of the invention is also applicable to other Claus plant configurations where one or more of the Claus catalytic reactors are periodically operated under conditions for forming and depositing sulfur on catalysts therein and also to Claus plant configurations with two or more Claus catalytic reactors all of which are operated above the sulfur dewpoint.

TABLE 4

Recycle Stream Composition and Rate for Modified ELSE Configurations
Steam Dilution of Regeneration Gas And O$_2$ Enriched Furnace Air

|  | Plant A | Plant B |
|---|---|---|
| Regeneration Diluent Source | Steam | Steam |
| O$_2$ Concentration in Furnace Air | 0.2153 | 0.2603 |
| Recycle Gas Composition, mol %: | | |
| H$_2$ | 0.00 | 0.88 |
| H$_2$O | 8.66 | 8.66 |
| CO | 0.00 | 0.67 |
| N$_2$ | 83.93 | 78.99 |
| O$_2$ | 0.00 | 0.00 |
| CO$_2$ | 0.00 | 8.29 |
| H$_2$S | 0.00 | 2.51 |
| SO$_2$ | 7.41 | 0.00 |
| Total | 100.00 | 100.00 |
| Recycle Gas Rate | | |
| Percent of Acid Gas Rate | 16.78 | 42.59 |
| Percent of WHBl Effl Rate | 5.63 | 14.29 |
| Incremental Increase in Size of the Claus Plant due to Recycle Stream as a Percent of the Claus Size Without the Recycle, Based on WHBl Effluent. | 0.00 | 0.00 |
| Incremental Increase in Cost of the Claus Plant due to Recycle Stream as a Percent of the Claus Cost Without the Recycle | 0.00 | 0.00 |

As can be readily understood, the aspects of the invention illustrated by this EXAMPLE would be very economical for those plants that have available a source of oxygen or oxygen enriched air since the addition of equipment (the adsorptive Claus catalytic reactors if desired, the ZnO absorbers and regenerators, and the regeneration recycle equipment) to increase the recovery of sulfur will be possible without modifications to the Claus plant.

The invention has been described in terms of preferred embodiments to illustrate the invention in its various aspects and applications. The invention, however, is not limited to the particular applications described herein, but by the claims appended hereto.

What is claimed is:

1. In a process in which ZnO is used to absorb at least one of H$_2$S and SO$_2$ from Claus Plant tail gas producing ZnS and in which ZnS is regenerated using O$_2$ producing a regeneration effluent which is returned to the Claus Plant from which the tail gas is derived, the step of reducing the volume flow of regeneration effluent containing sulfur species which must be further processed by diluting the O$_2$-containing gas used for regeneration with a diluent consisting essentially of added water prior to regeneration of ZnS to ZnO and after such regeneration removing at least a portion of the added water.

2. A process for diminishing the quantity of sulphur species in the tailgas from a Claus plant and for producing plant effluent having such a diminished quantity of sulfur species comprising:

removing H$_2$S and SO$_2$ from tailgas of a Claus plant by reaction with ZnO in an absorber zone, optionally after converting sulfur species to H$_2$S, producing ZnS and plant effluent;

regenerating ZnS to ZnO producing a dried stream comprising one of H$_2$S and SO$_2$ by steps comprising diluting an O$_2$-containing gas used for regeneration with a diluent consisting essentially of added water vapor and using the resulting dilute O$_2$-containing stream for regenerating ZnS to ZnO producing a regeneration effluent stream comprising SO$_2$, removing at least a portion of the added water from the regeneration effluent stream and producing the dried regeneration stream comprising one of H$_2$S and SO$_2$; and returning the dried regeneration stream comprising one of H$_2$S and SO$_2$ to the Claus plant.

3. The process of claim 2 wherein the step of diluting the O$_2$-containing gas with water vapor comprises increasing water vapor content to greater than about 80 mol percent in the resulting stream.

4. The process of claim 2 wherein the step of diluting the O$_2$-containing gas with water vapor comprises increasing water vapor content to the range of about 80 to about 99.6 mol percent water in the resulting stream.

5. The process of claim 2 wherein the step of diluting the O$_2$-containing gas with water vapor comprises increasing water vapor content to the range of about 80-98 mol percent water in the resulting stream.

6. The process of claim 2 wherein the step of diluting the O$_2$-containing gas with water vapor comprises increasing water vapor content to the range of about 96.5-99.6 mol percent water in the resulting stream.

7. The process of claim 2 wherein the step of removing water from the regeneration effluent stream comprises removing water and producing a dried regeneration effluent stream comprising SO$_2$.

8. The process of claim 2 wherein the step of removing water from the regeneration effluent stream comprises hydrogenating the regeneration effluent stream comprising SO$_2$ under conditions for converting SO$_2$ to H$_2$S and removing water from the resulting H$_2$S containing stream and producing a dried regeneration effluent stream comprising H$_2$S.

9. The process of claim 2 further comprising diminishing the total volume flow of gases through the Claus plant by enriching the oxygen content of the oxidant feed to the Claus plant, wherein the total volume flow comprises furnace reaction products of acid gas feed to the Claus plant, oxidant feed to the Claus plant, and the dried regeneration stream.

10. The process of claim 9 wherein the oxygen of the oxidant feed to the Claus plant is increased to the range of about 21 to 100 mol percent.

11. The process of claim 9 wherein the step of removing water from the regeneration effluent stream comprises removing water and producing a dried regeneration effluent stream comprising SO$_2$; and wherein the oxygen content of the oxidant feed to the Claus plant is increased to the range of about 21 to about 31 mol percent.

12. The process of claim 9 wherein the step of removing water from the regeneration effluent stream comprises hydrogenating the regeneration effluent stream comprising $SO_2$ under conditions for converting $SO_2$ to $H_2S$ and removing water from the resulting $H_2S$ containing stream and producing a dried regeneration effluent stream comprising $H_2S$; and wherein the oxygen content of the oxidant feed to the Claus plant is increased to the range of about 24 to about 36 mol percent.

13. Apparatus for diminishing the quantity of sulfur species in a stream comprising:

a Claus plant comprising a Claus furnace and at least one Claus catalytic reactor for producing a Claus plant tailgas comprising $H_2S$ and $SO_2$;

absorber means for removing $H_2S$ and $SO_2$ from the tailgas by reaction with ZnO, optionally after converting sulfur species to $H_2S$, producing ZnS and plant effluent;

regenerator means for regenerating ZnS to ZnO producing a dried stream comprising one of $H_2S$ and $SO_2$, the regenerator means comprising:

means for providing a diluent consisting essentially of added water vapor and for diluting $O_2$-containing gas therewith and for using the dilute $O_2$-containing stream for regenerating ZnS to ZnO producing a regeneration effluent stream comprising $SO_2$; and means for removing water from the regeneration effluent stream and for producing the dried regeneration stream comprising one of $H_2S$ and $SO_2$; and means for returning the dried regeneration stream comprising one of $H_2S$ and $SO_2$ to the Claus plant.

14. The Apparatus of claim 13 wherein the means for removing water comprises hydrogenation means for hydrogenating $SO_2$ in the regeneration effluent stream to $H_2S$ and wherein the means for removing water is effective for removing water from the resulting $H_2S$ containing stream, producing a dried regeneration effluent stream comprising $H_2S$.

* * * * *